(12) United States Patent
Smith

(10) Patent No.: US 8,833,079 B2
(45) Date of Patent: Sep. 16, 2014

(54) METHOD AND APPARATUS FOR GENERATING ELECTRICITY

(76) Inventor: Douglas W. P. Smith, Port Coquitlam (CA)

( * ) Notice: Subject to any disclaimer, the term of this patent is extended or adjusted under 35 U.S.C. 154(b) by 628 days.

(21) Appl. No.: 12/655,663

(22) Filed: Jan. 4, 2010

(65) Prior Publication Data

US 2010/0126171 A1 May 27, 2010

Related U.S. Application Data

(63) Continuation-in-part of application No. 12/284,226, filed on Sep. 18, 2008, now Pat. No. 8,176,724.

(30) Foreign Application Priority Data

Nov. 19, 2009 (EP) ...................................... 09014452

(51) Int. Cl.

| | | |
|---|---|---|
| *F01K 25/02* | (2006.01) | |
| *F02C 1/04* | (2006.01) | |
| *F02C 3/30* | (2006.01) | |
| *F03G 6/00* | (2006.01) | |
| *F03G 7/00* | (2006.01) | |
| *F02C 7/141* | (2006.01) | |
| *F01K 7/16* | (2006.01) | |
| *F01K 21/04* | (2006.01) | |
| *F02C 1/05* | (2006.01) | |
| *F02C 6/18* | (2006.01) | |

(52) U.S. Cl.
CPC . *F02C 1/05* (2013.01); *F02C 7/141* (2013.01); *F01K 7/16* (2013.01); *Y02E 10/46* (2013.01); *Y02T 50/671* (2013.01); *Y02T 50/675* (2013.01); *Y02E 20/14* (2013.01); *F01K 21/04* (2013.01); *F02C 6/18* (2013.01)
USPC .............. 60/650; 60/682; 60/775; 60/641.14; 60/641.15

(58) Field of Classification Search
USPC ............ 60/39.19, 39.3, 39.53, 659, 650, 674, 60/681, 39.59, 641.8, 641.11, 641.12, 60/641.13, 641.14, 641.15, 775
See application file for complete search history.

(56) References Cited

U.S. PATENT DOCUMENTS

| | | | |
|---|---|---|---|
| 2,869,324 A | | 1/1959 | Foote |
| 3,006,146 A | * | 10/1961 | Jackson ........................ 376/391 |

(Continued)

OTHER PUBLICATIONS

Jonsson, Maria, Advanced Power Cycles with Mixtures as the Working Fluid, 2003, Department of Chemical Engineering and Technology, Royal Institute of Technology, SE-100 44 Stockholm, Sweden; See p. 38¶2; pp. 39-50, §4.2.

(Continued)

*Primary Examiner* — Christopher Jetton
(74) *Attorney, Agent, or Firm* — Laurence C. Bonar

(57) ABSTRACT

A method of converting energy into electricity using a gaseous working fluid and an evaporative fluid comprises pressuring the working fluid (20) in a compressor (1), heating the high-pressure working fluid (22) in a recuperator (8) using thermal energy in low-pressure working fluid (34) emerging from a turbine (2), adding energy from an energy source (5, 6) to increase the temperature and enthalpy of the working fluid (32), expanding the working fluid (32) through the turbine (2), using the turbine to generate electricity, and cooling the low-pressure working fluid (34) emerging from the turbine in the recuperator. The method further comprises lowering the temperature and increasing the mass of the high-pressure working fluid (22) after leaving the compressor (1), and/or after leaving the recuperator (8), by introducing the evaporative fluid (48, 49) to produce evaporative cooling.

28 Claims, 6 Drawing Sheets

(56) References Cited

U.S. PATENT DOCUMENTS

| | | | |
|---|---|---|---|
| 4,189,922 A * | 2/1980 | Bellofatto | 60/641.8 |
| 4,403,601 A * | 9/1983 | Hunt | 126/678 |
| 4,492,085 A * | 1/1985 | Stahl et al. | 60/649 |
| 4,753,068 A * | 6/1988 | El-Masri | 60/39.511 |
| 4,829,763 A | 5/1989 | Rao | |
| 5,448,889 A * | 9/1995 | Bronicki | 60/641.14 |
| 5,513,488 A * | 5/1996 | Fan | 60/775 |
| 5,566,542 A * | 10/1996 | Chen et al. | 60/775 |
| 6,141,949 A * | 11/2000 | Steinmann | 60/772 |
| 6,305,158 B1 * | 10/2001 | Nakhamkin et al. | 60/39.53 |
| 6,708,497 B2 * | 3/2004 | Doebbeling et al. | 60/775 |
| 6,981,377 B2 * | 1/2006 | Vaynberg et al. | 60/641.8 |

OTHER PUBLICATIONS

Wolf, J; Barone, F; Yan, J: Analysis of Evaporative Biomass Air Turbine Cycle With Gasification for Topping Combustion, 2002, J. Eng. Gas Turbines Power, vol. 124, pp. 757-751.

\* cited by examiner

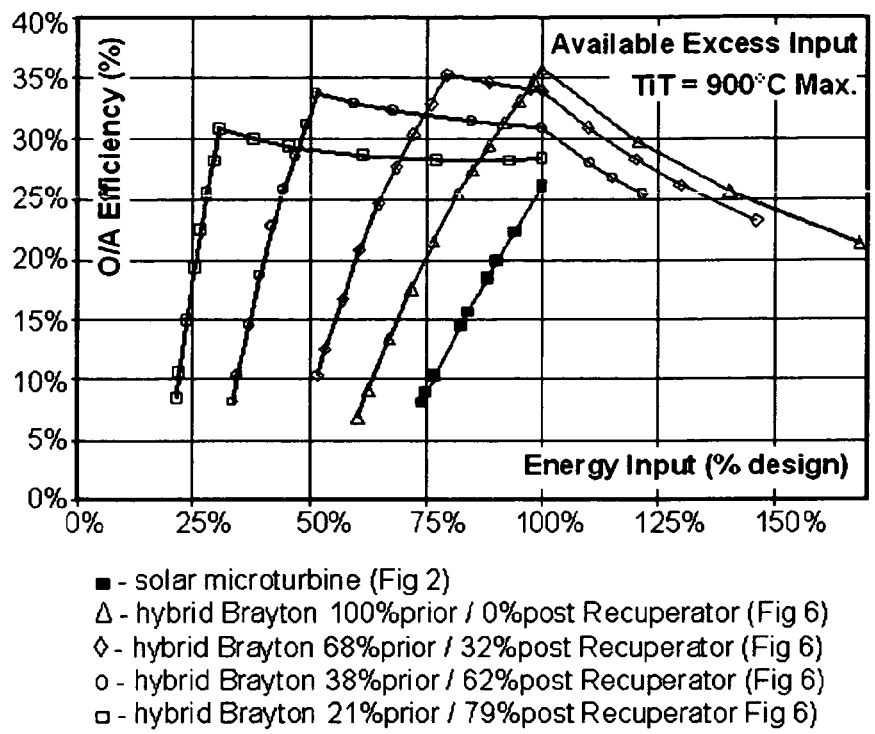

- ■ - solar microturbine (Fig 2)
- △ - hybrid Brayton 100%prior / 0%post Recuperator (Fig 6)
- ◊ - hybrid Brayton 68%prior / 32%post Recuperator (Fig 6)
- o - hybrid Brayton 38%prior / 62%post Recuperator (Fig 6)
- □ - hybrid Brayton 21%prior / 79%post Recuperator Fig 6)

Figure 16

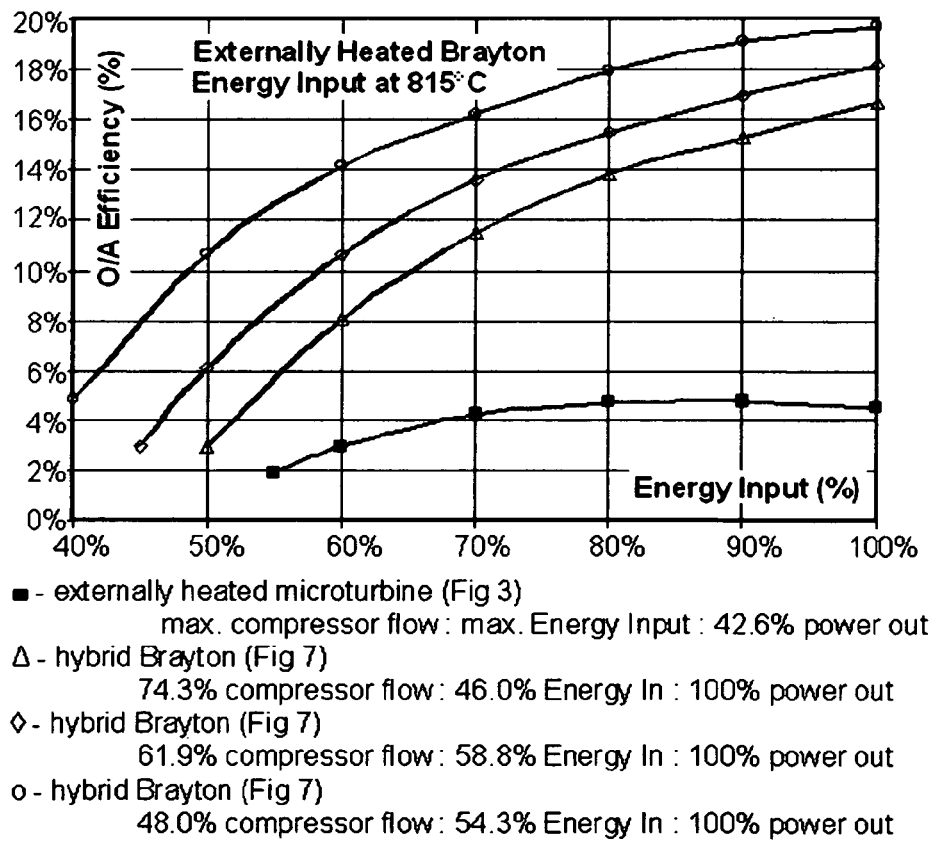

- ■ - externally heated microturbine (Fig 3)
  max. compressor flow : max. Energy Input : 42.6% power out
- △ - hybrid Brayton (Fig 7)
  74.3% compressor flow : 46.0% Energy In : 100% power out
- ◊ - hybrid Brayton (Fig 7)
  61.9% compressor flow : 58.8% Energy In : 100% power out
- o - hybrid Brayton (Fig 7)
  48.0% compressor flow : 54.3% Energy In : 100% power out

Figure 17

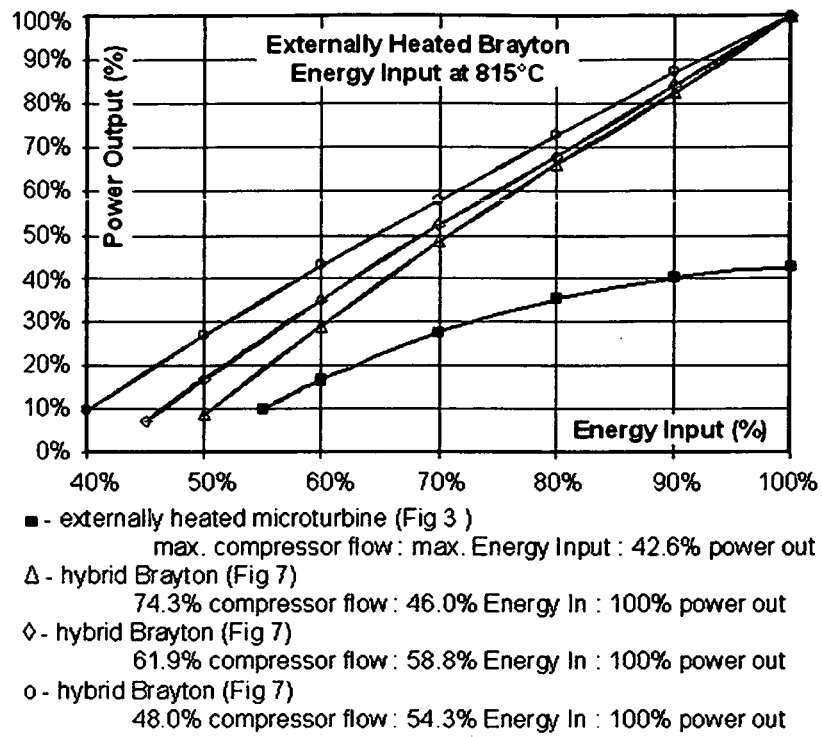

- ■ - externally heated microturbine (Fig 3)
  max. compressor flow : max. Energy Input : 42.6% power out
- △ - hybrid Brayton (Fig 7)
  74.3% compressor flow : 46.0% Energy In : 100% power out
- ◊ - hybrid Brayton (Fig 7)
  61.9% compressor flow : 58.8% Energy In : 100% power out
- ○ - hybrid Brayton (Fig 7)
  48.0% compressor flow : 54.3% Energy In : 100% power out

Figure 18

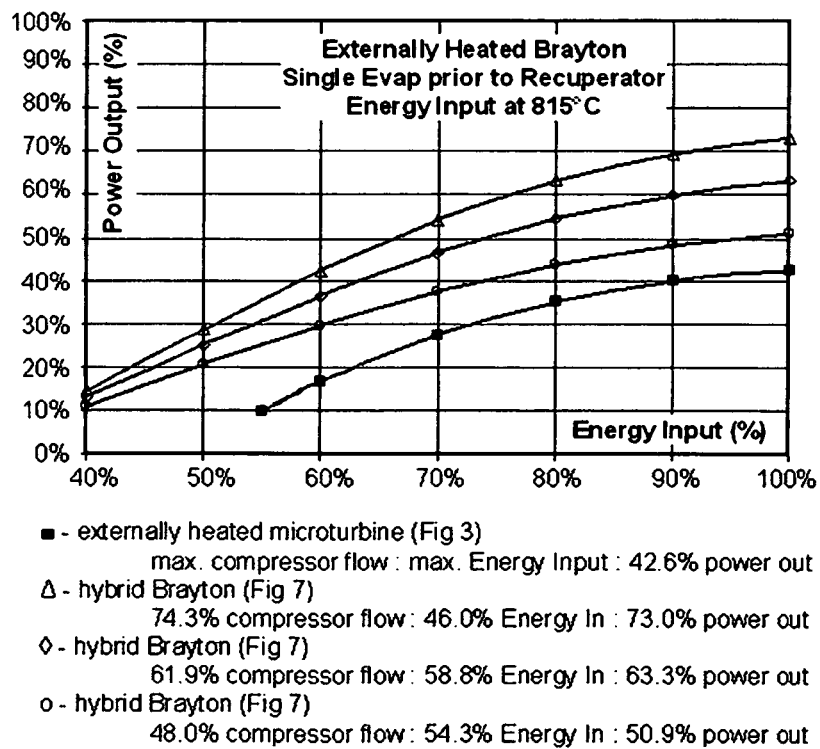

- ■ - externally heated microturbine (Fig 3)
  max. compressor flow : max. Energy Input : 42.6% power out
- △ - hybrid Brayton (Fig 7)
  74.3% compressor flow : 46.0% Energy In : 73.0% power out
- ◊ - hybrid Brayton (Fig 7)
  61.9% compressor flow : 58.8% Energy In : 63.3% power out
- ○ - hybrid Brayton (Fig 7)
  48.0% compressor flow : 54.3% Energy In : 50.9% power out

Figure 19

METHOD AND APPARATUS FOR GENERATING ELECTRICITY

PRIORITY CLAIM & CITATION

This application claims priority from U.S. patent application Ser. No. 12/284,226 filed Sep. 18, 2008.

TECHNICAL FIELD OF THE INVENTION

This invention relates to the field of electricity generation using a modified form of the thermodynamic power cycle known as the Brayton cycle, conventionally used in gas turbines and jet engines.

BACKGROUND OF THE INVENTION

Gas turbines used for power generation are designed over a wide range of power outputs and with a variety of configurations and operating conditions. They operate using the Brayton cycle which is a single-phase vapor power cycle. Typical systems are open-loop using atmospheric air as the working fluid. In the Brayton cycle air is compressed then fuel is added and combusted then the combined air and combustion gases are expanded through a turbine. A portion of the work produced by the turbine is used for compression of the incoming air with the balance of the turbine work being made available as net output power. The power output of gas turbines may be used for direct thrust as in pure jet engines, used for work and/or thrust as in fan jets and turboprops, or used for work as in electrical power generation.

Microturbines are a recent focus of gas turbine design. They can be described generally as being small scale and using a single stage of compression/expansion. They are usually recuperated designs that use a single shaft connecting the turbine to the compressor and power generator. They operate by drawing air from the atmosphere past the power generator for cooling purposes then compressing the air, passing it through one side of a recuperator, adding fuel, combusting the mixture, expanding the combustion gases through a turbine then passing them through the other side of the recuperator before release to the atmosphere. The present discussion will focus on microturbines that follow this described operation but it will be apparent to one experienced in the art that what is taught can be applied to other turbine designs.

Microturbines, using the single-stage recuperated design, have been packaged in sizes ranging from 30 kWe to 250 kWe and show an O/A efficiency of about 26%. (see e.g. http://www.capstoneturbine.com/prodsol/products/index.asp). By contrast, small industrial turbines using multi-stage axial design are available as small as 1200 kWe. The multi-stage axial design systems will produce about 24.3% O/A efficiency without the use of a recuperator but with output gearing; such systems have little benefit to be gained from using a recuperator (see e.g. http://mysolar.cat.com/cda/files/126912/7/ds20pg.pdf)

In the present patent application, computer simulations, based on thermodynamic principles well known to those of ordinary skill in the art, have been used to analyze several power generating systems useable for electrical generation which employ the Brayton cycle, and to clarify the operating characteristics and limitations of such prior-art Brayton cycle systems. The invention of the present patent application provides novel Brayton cycle systems which are shown to overcome most of the limitations demonstrated by the above analysis. Analysis of these novel Brayton cycle systems shows that their operating characteristics provide ready means to adapt the operation of these systems to varying heat-energy input, and to control the system for optimum efficiency under conditions of varying heat-energy input.

Many turbine systems used for power generation are operated at constant speed. For large turbines constant speed operation may be selected to match the desired speed of the generator which needs to maintain a constant frequency of output power. Using a constant speed also ensures that the compressor operates in a known regime and avoids surge conditions. Microturbines have an additional reason for constant speed operation since they may be operating above a natural vibration frequency of the shaft. Maintaining a constant speed of operation ensures that uncontrolled vibration is never encountered.

Microturbines are small-scale systems and normally operate at high rpm. Using single-stage operation it is found that the compressor will typically absorb over two-thirds of the power produced by the turbine. In these conditions a recuperator is necessary to recover sufficient turbine exhaust energy to make the efficiency acceptable. It should be noted that energy added to the working gas flow is incremental to the internal energy of the working gas and further, that mass is added to the working gas with the addition of fuel. It is an implicit assumption that the input of energy into the system is a control variable through the control of fuel flow. Although large scale turbine systems using multiple compressor stages and intercoolers can achieve overall power efficiencies up to about 40%, single-stage recuperated microturbines will typically achieve about 26% overall power efficiency at full power production with a 900° C. turbine inlet temperature (TiT).

A prior art microturbine arrangement is shown in FIG. 1. Air, used as working fluid (20), is drawn into compressor (1), sometimes across power generator (4) to effect cooling. Working fluid (22) exits compressor (1) at a higher pressure and temperature and is directed to the first side of recuperator (8). High-pressure working fluid (22) is indirectly heated by heat exchange with turbine exhaust (34) in the recuperator (8) and exits the recuperator (8) at a higher temperature as high-pressure working fluid (26) which is directed into combustor (5). Fuel (40) is added to combustor (5) and burned to increase the temperature of the mixture of working fluid (26) and fuel (40) which exits combustor (5) as hot, high-pressure working fluid (32) and is directed into turbine (2). High-pressure, hot working fluid (32) expands through turbine (2) releasing work into shaft (3) and exits turbine (2) as low-pressure, hot turbine exhaust (34). Heat is transferred from low-pressure, hot turbine exhaust (34) to high-pressure working fluid (22) in recuperator (8), the low pressure exhaust 34 being arranged in counter-flow to the high pressure working fluid (22) in the recuperator 8. Work released into shaft (3) serves to supply the parasitic work required by compressor (1) and excess work is used to drive power generator (4).

It is noted that overall power efficiency drops rapidly as energy input is reduced. Operating a microturbine at 50% power will cause the overall efficiency to drop to about 15½%. This results in 83½% of the full energy input capacity being required to maintain half power output. In fact this microturbine requires almost 70% of its full energy input capacity just to be self-sustaining without producing any output power. This is strictly due to the high percentage of energy used to operate the compressor at full power and operating at constant speed which requires a constant parasitic energy requirement. This limits the usefulness of a microturbine for applications in which full power is not always needed or can be tolerated. The small turndown range is revealed in FIG. 11.

A solar application of the Brayton cycle has been proposed and development work implemented by Solhyco (http://www.greth.fr/solhyco/public/solhyco.php#sol4). In this case compressed working fluid (26) leaving recuperator (8) is directed to solar collector (6) before entering combustor (5). This arrangement is shown in FIG. 2 and operates in the same manner as the microturbine shown in FIG. 1 with added solar energy (42) input into working fluid (26) in solar collector (6). For both the microturbine shown in FIG. 1 and the solar microturbine shown in FIG. 2 there is a limit temperature for working fluid (32) entering turbine (2) which represents the maximum temperature allowed due to equipment restrictions.

In an ideal application, the temperature leaving solar collector (6) would be sufficient to be used in the turbine without added energy in combustor (5) and this will be the assumed case for these discussions. The solar microturbine arrangement of FIG. 2 differs from the microturbine arrangement of FIG. 1 only in that addition of solar energy (42) in solar collector (6) does not add mass to the working gas flow. For all practical purposes added solar energy (42) is independent of the temperature of working fluid (26). All of the turndown limitations discussed for the microturbine also applies to the solar microturbine as well.

When operating at maximum solar energy input capacity for the microturbine system with a TiT of 900° C., the compressor will absorb about 68% of the turbine power produced and the microturbine system will operate at an efficiency of 26%. As power output (4) reduces, the parasitic load of compressor (1) remains constant and thus represents a larger portion of the total power produced by turbine (2). The efficiency reduces rapidly since the parasitic compressor load represents an increasing portion of the total turbine power.

The turndown issue for the solar microturbine shown in FIG. 2 is more influential than for the microturbine shown in FIG. 1 since, in practice, it is difficult to design and maintain the maximum energy input through a solar collector. The implicit understanding of microturbine operation is that fuel input is a control variable and thus efficiency is the primary concern of microturbine operation. However in the solar application we find that the energy input is determined by conditions independent of the solar microturbine system. In this case the primary operational concern is the power output as compared to the energy input. FIG. 11 indicates the level of energy input required to produce output power. If the energy input drops by 25% then the power output drops by almost 75%, which calculates to an efficiency of 9%. If the solar collector energy drops by 35% then the Brayton system ceases to operate. In practice, solar collectors vary much more than 35% from morning to night, through seasons, with changes in atmospheric conditions and under passing clouds. The additional problem is that solar input energy greater than the 100% design could result in a TiT in excess of material restrictions.

The large drop in power production and efficiency associated with a drop of solar energy means that a practical application would need to augment operation with fuel input to maintain reasonable power production thus making the system a solar-assisted power converter.

An externally heated application of the Brayton cycle, in which the working fluid is heated by an external fluid heat source, has been proposed many times in the past. An example of such a power generation approach is the BG100 system developed by Talbotts Biomass Energy Systems Limited of Stafford, UK (http://www.talbotts.co.uk/bgen.htm). This external Brayton cycle arrangement is shown in FIG. 3. In this case compressed working fluid (26) leaving recuperator (8) is directed to heater (19) and heated to become working fluid (32) by indirect energy transfer which cools external hot fluid (50) to become external cool fluid (52). As with the microturbine shown in FIG. 1 and the solar microturbine shown in FIG. 2 there is a limit temperature for working fluid (32) entering turbine (2) which represents the maximum temperature allowed due to equipment limitations. In most practical applications of the external Brayton cycle this temperature restriction is more limiting due to the greater temperature of external hot fluid (50) necessary to maintain heat transfer to working fluid (32), the greater amount of material exposed to these limit temperatures, and the cost associated with specialty materials capable of handling such high temperature.

It should be noted in the arrangement shown in FIG. 3 that the temperature of external cool fluid (52) must be higher than the temperature of compressed working fluid (26) entering heater (19) and thus the amount of energy transferred is not independent of the temperatures of operation. The temperature of external hot fluid (50) is limited by material construction of heater (19) and thus the energy input into heater (19) can only be increased by the increased flow of external hot fluid (50). Since the flow of working fluid (26) is fixed by constant speed of compressor (1) then adding energy into the system requires a greater temperature of working fluid (32) but is limited by the temperature of external hot fluid (50) which, in itself, is limited. It is quickly found that increasing energy input into heater (19) results in very little additional energy entering working fluid (26) with most leaving in external cool fluid (52). Of the additional energy which does enter working fluid (26) only a portion is converted to work in turbine (2) with the balance exiting as increased temperature of turbine exhaust (34). This results in an increase in temperature in working fluid (26) entering heater (19) which, in turn, reduces the temperature difference with external cool fluid (52) and reduces the transfer of energy into working fluid (26). The competing effects of increased flow of external hot fluid (50) and increased temperature of external cool fluid (52) creates a limit in the amount of energy that can be transferred in heater (19). The power production by the arrangement shown in FIG. 3 is less than half of the capacity of the original microturbine equipment for the same compression and flow rates and it has an overall efficiency that is a fraction of the microturbine shown in FIG. 1.

SUMMARY OF THE INVENTION

According to the present invention there is provided a method of converting energy into electricity using a gaseous working fluid and an evaporative fluid, comprising steps of: pressuring the gaseous working fluid in a compressor; heating the high-pressure working fluid in a recuperator by heat exchange with low-pressure working fluid emerging from a turbine; adding energy to the high-pressure working fluid to increase the temperature and enthalpy of the working fluid; expanding the working fluid through the turbine, using the turbine to generate electricity; and cooling the low-pressure working fluid emerging from the turbine in the recuperator, the method further comprising lowering the temperature and increasing the mass of the high-pressure working fluid after leaving the compressor, and/or after leaving the recuperator, by introducing the evaporative fluid to produce evaporative cooling.

The invention also provides an apparatus for converting energy into electricity using a gaseous working fluid and an evaporative fluid, comprising: a compressor for pressurizing the working fluid; a recuperator to heat the pressurized working fluid by heat exchange with low-pressure working fluid leaving a turbine; an energy source for increasing the temperature and enthalpy of the pressurized recuperated working fluid; a turbine for expanding the pressurized recuperated working fluid from the energy source to a low-pressure working fluid; an electrical generator coupled to the turbine; and means for conveying the low-pressure working fluid emerging from the turbine to the recuperator; the apparatus further comprising means for lowering the temperature and increasing the mass of the high-pressure working fluid after leaving the compressor, and/or after leaving the recuperator, by introducing the evaporative fluid to produce evaporative cooling.

The invention also provides a method for converting energy into electricity using a gas as working fluid and an evaporative fluid, wherein the working fluid and the evaporative fluid are captured in a closed cycle, the method comprising steps of: pressuring the gaseous working fluid mixture which is saturated with evaporative fluid vapour in a compressor which causes an increase in pressure and temperature of the working fluid; adding a portion of the evaporative fluid liquid from a preheater to cause evaporative cooling and mass increase of the working fluid vapor; heating the high-pressure working fluid mixture in a recuperator; adding the balance of the evaporative fluid liquid from the preheater to cause cooling and further mass increase of the working fluid vapor; conveying the high-pressure working fluid mixture to an energy source; adding energy from the energy source to increase the temperature and enthalpy of the working fluid; expanding the high-pressure working fluid through a turbine and using the work of the turbine to generate electricity; transferring energy out of the low-pressure working fluid emerging from the turbine in the recuperator; transferring energy out of the low-pressure working fluid emerging from the recuperator in the preheater to increase the temperature of the evaporative fluid liquid; lowering the temperature and condensing a portion of the evaporative fluid within the low-pressure working fluid emerging from the preheater in a cooler in which the energy is removed by an external coolant or by radiation; separating evaporative fluid liquid condensed in the cooler; directing the evaporative fluid liquid through a pressuring pump to the preheater; and directing the gaseous working fluid mixture saturated with evaporative fluid vapor to the inlet of the compressor.

The invention also provides a method for converting energy into electricity using a gas as working fluid and an evaporative fluid, wherein the working fluid and evaporative fluid are captured in a closed cycle and wherein the evaporative fluid liquid remains in suspension in the gaseous working fluid within the operating environment under all operating conditions, the method comprising steps of: pressuring a gaseous working fluid mixture, saturated with evaporative fluid vapor and with liquid evaporative fluid in suspension, in a compressor which causes a portion of the evaporative fluid liquid to vaporize; heating the high-pressure working fluid mixture, saturated with evaporative fluid and with liquid evaporative fluid in suspension, in a recuperator which causes a further portion of the evaporative fluid liquid to vaporize; conveying the high-pressure working fluid mixture to an energy source; adding energy from the energy source to increase the temperature and enthalpy of the working fluid and causing the balance of the evaporative fluid liquid to vaporize; expanding the high-pressure working fluid through a turbine and using the work of the turbine to generate electricity; cooling low-pressure working fluid emerging from the turbine in the recuperator; lowering the temperature and condensing evaporative fluid within low-pressure working fluid emerging from the recuperator in a cooler in which the energy is removed by an external coolant or by radiation; and directing the gaseous working fluid mixture, saturated with evaporative fluid and with liquid evaporative fluid in suspension, to the inlet of the compressor.

BRIEF DESCRIPTION OF THE DRAWINGS

FIG. 16 is a graph of overall efficiency as a function of energy input including the effects of excess input energy with a comparison between the solar microturbine shown in FIG. 2 and the hybrid Brayton cycle shown in FIG. 6 and with a variation in the ratio of evaporative cooling before and after the recuperator.

FIG. 17 is a graph of overall efficiency as a function of energy input for the externally heated hybrid Brayton microturbine shown in FIG. 7 with a variation in the amount of working fluid passed through the compressor.

FIG. 18 is a graph of power production as a function of energy input for the externally heated hybrid Brayton microturbine shown in FIG. 7 with a variation in the amount of working fluid passed through the compressor.

FIG. 19 is a graph of overall efficiency as a function of energy input for the externally heated hybrid Brayton microturbine shown in FIG. 7 with evaporative cooling applied prior to the recuperator only.

In the drawings the same reference numerals are used for the same or equivalent components.

DETAILED DESCRIPTION OF THE EMBODIMENTS

Figure 1:
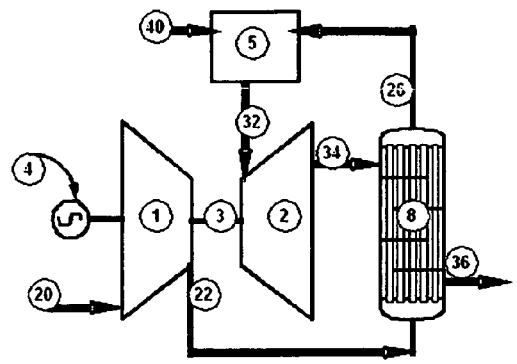
FIGS. 1 to 3 (described above) are schematic diagrams of prior art single-stage microturbines with recuperator.
Figure 2:
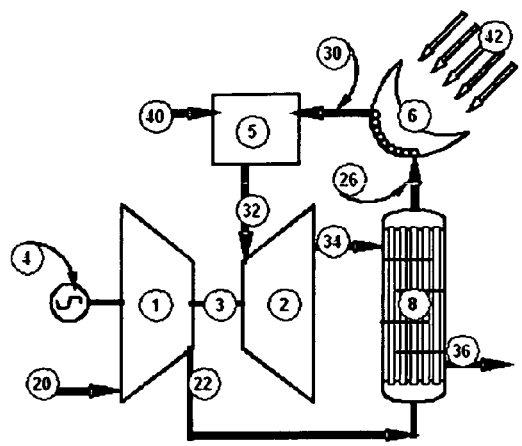
Figure 11:
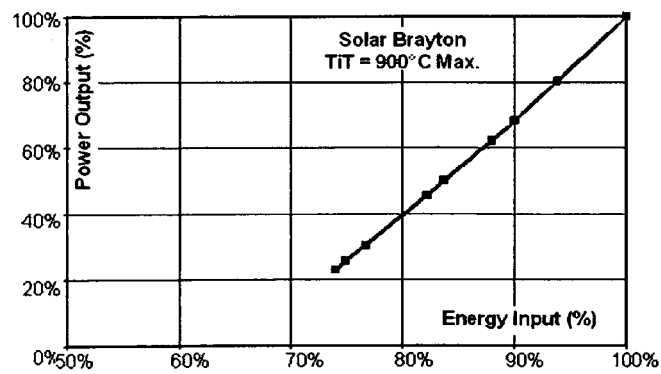
FIG. 11 is a graph describing power production as a function of energy input for a microturbine shown in FIG. 1 or solar microturbine shown in FIG. 2.

Thermodynamic analysis of the microturbine shown in FIG. 1 is substantially equal to the thermodynamic analysis of the solar microturbine shown in FIG. 2 which reveals a maximum overall efficiency of 26% and a turndown characteristic shown in FIG. 11. Extension of this graph indicates that a 35% reduction of input energy would reduce the output power to zero. Characteristics of the solar microturbine shown in FIG. 2 will serve as the baseline of comparison for hybrid Brayton modifications taught by this patent disclosure. The following discussions made in comparison to the solar microturbine shown in FIG. 2 will apply equally to effects on the microturbine shown in FIG. 1. Discussions of effects of the hybrid Brayton modifications on the externally heated microturbine shown in FIG. 3 will highlight the implication of the temperature dependent nature of heat transfer in the external heater.

Figure 4:
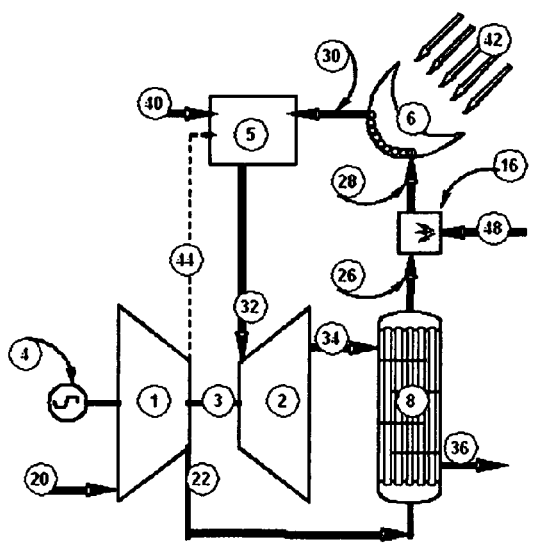
FIG. 4 is a schematic diagram of a solar microturbine that applies evaporative cooling of the working fluid immediately after the recuperator.

The hybrid Brayton modification shown in FIG. 4 includes adding water (48) into chamber (16) immediately after recuperator (8) to cause evaporative cooling of working fluid (26). The effect is a reduced temperature of working fluid (28) entering solar collector (6) which allows more solar energy (42) to be absorbed before reaching the limit temperature for working fluid (32) entering turbine (2). The added mass of water (48) passing through turbine (2) means less working fluid (20) needs to be drawn into compressor (1), less parasitic work from shaft (3) is required and compressor (1) can be physically smaller. Since less work in shaft (3) is required, turbine (2) can be physically smaller to supply the same net output power (4). A general limit of added water (48) is the mass that would bring working fluid (28) to 100% humidity although this limit can be exceeded in certain circumstances. For operation using input fuel (40), an optional bypass flow (44) of air can be used to feed combustor (5) directly should humidity levels of working fluid (30) adversely affect combustion.

Figure 13:
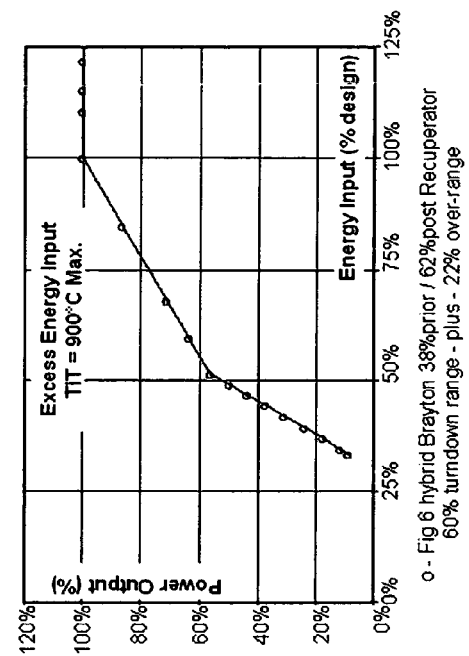
FIG. 13 is a graph of overall efficiency as a function of power produced with a comparison between the solar microturbine shown in FIG. 2 and the hybrid Brayton cycle shown in FIG. 4 with both temperature control and evaporative fluid mass flow control.

The hybrid Brayton system shown in FIG. 4 will operate at lower levels of power output (4) when solar energy (42) input is reduced. Under reduced energy input conditions, mass of water (48) introduced into chamber (16) is reduced to maintain working fluid (30) at the limit temperature for turbine (2). FIG. 13 shows the turndown effects of controlling the introduction of water (48) during reduced input of solar energy (42) as compared to reducing the temperature of working fluid (32) and with comparison to the solar microturbine baseline. When the mass flow of water (48) reaches zero during turndown, then the temperature of working fluid (32) is allowed to reduce. Maintaining a high overall efficiency during turndown is a significant system benefit of this hybrid Brayton modification.

Figure 5:
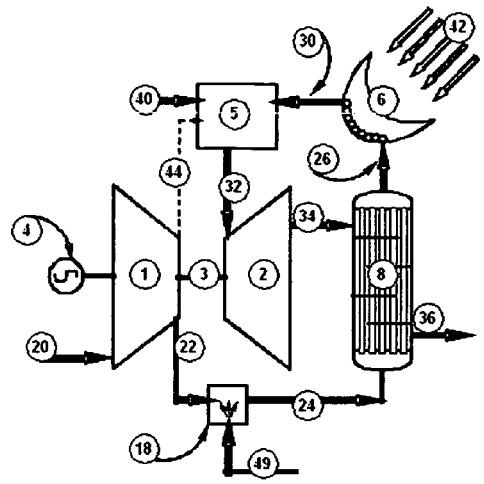
FIG. 5 is a schematic diagram of a solar microturbine that applies evaporative cooling of the working fluid immediately prior to the recuperator.

The hybrid Brayton modification shown in FIG. 5 includes adding water (49) into chamber (18) immediately before recuperator (8) to cause evaporative cooling of working fluid (22). The effect is a reduced temperature of working fluid (24) entering recuperator (8) which allows more energy from turbine exhaust (34) to be transferred and recovered within the power cycle. The greater energy kept within the power cycle serves to increase the overall efficiency. Adding sufficient water (48) to bring working fluid (24) to 100% humidity will increase the overall efficiency by 38%; from about 26% to about 36%. The added mass of water (49) passing through turbine (2) means less working fluid (20) needs to be drawn into compressor (1), less parasitic work from shaft (3) is required and compressor (1) can be physically smaller. Since less work in shaft (3) is required, turbine (2) can be physically smaller to supply the same net output power (4).

Figure 12:
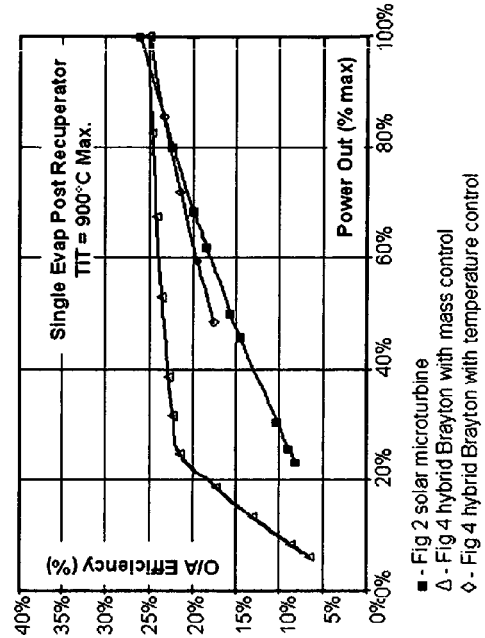
FIG. 12 is a graph of overall efficiency as a function of power produced with a comparison between the solar microturbine shown in FIG. 2 and the hybrid Brayton cycle shown in FIG. 5 with both temperature control and evaporative fluid mass flow control.

The hybrid Brayton system shown in FIG. 5 will operate at lower levels of power output (4) when solar energy (42) input is reduced. Under reduced energy input conditions, mass of water (49) introduced into chamber (18) is reduced to maintain working fluid (32) at the limit temperature for turbine (2). Alternatively under reduced energy input conditions, the mass of water (49) introduced into chamber (18) can be kept constant while allowing the temperature of working fluid (32) to reduce. FIG. 12 shows the turndown effects of controlling the introduction of water (49) during reduction of solar energy (42) input as compared to reducing the temperature of working fluid (32) and with comparison to the solar microturbine baseline. Maintaining a greater overall efficiency at all levels of operation is a significant system benefit of this hybrid Brayton modification.

Figure 6:
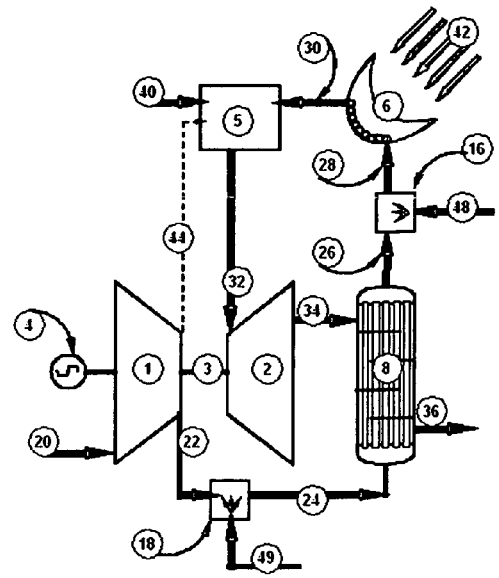
FIG. 6 is a schematic diagram of a solar microturbine that applies evaporative cooling of the working fluid both before the recuperator and after the recuperator.
Figure 14:
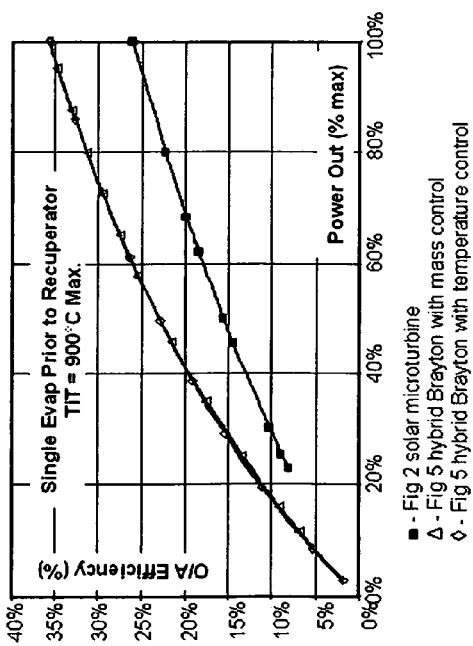
FIG. 14 is a graph of overall efficiency as a function of power produced with a comparison between the solar microturbine shown in FIG. 2 and the hybrid Brayton cycle shown in FIG. 6 and with a variation in the ratio of evaporative cooling before and after the recuperator.

The hybrid Brayton modifications shown in FIG. 6 includes adding water (49) into chamber (18) immediately before recuperator (8) to cause evaporative cooling of working fluid (22) and adding water (48) into chamber (16) immediately after recuperator (8) to cause evaporative cooling of working fluid (26). While maintaining the same net output power (4), a selection can be made of the relative amount of added water (49) compared to the amount of added water (48) to change the relative effects of overall efficiency increase and the increase in effective turndown range. FIG. 14 reveals the effects of turndown when the ratio of water introduction is altered. When the added water (49) is reduced then the working fluid (20) is also reduced which lessens the parasitic work taken from shaft (3) by compressor (1) and results in the peak efficiency to be realized at a lower power setting. However the efficiency of power production reduces only slightly at maximum power setting from the power setting at peak efficiency. Thus the effective range of turndown is increased when added water (49) is minimized.

It is recognized that the hybrid Brayton modifications shown in FIG. 4 and in FIG. 5 are special cases of the general hybrid Brayton modification shown in FIG. 6.

Figure 15:
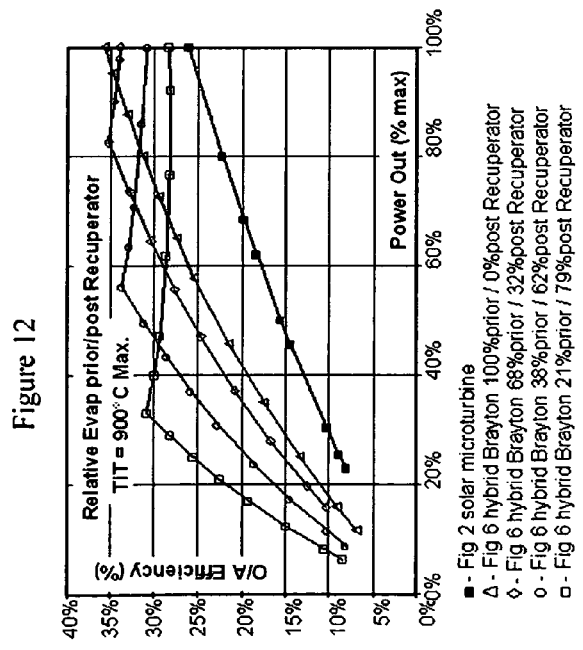
FIG. 15 is a graph of power output as a function of energy input showing the effects of excess input energy by limiting the output power to 100%.

FIG. 14 shows that water (48) is added at the upper turndown range to maintain the limit temperature of working fluid (32) until the maximum net output power (4) is reached. FIG. 16 reveals that excessive input of solar energy (42) can be controlled by further increasing the mass input of water (48) to reduce the temperature of working fluid (32) to maintain, and not exceed, the maximum net output power (4). FIG. 16 shows the amount of excess solar energy (42) that can be accommodated by hybrid Brayton systems of different evaporative cooling ratios. The system featured-in FIG. 15 is the arrangement shown in FIG. 6 wherein a spray ratio of 38% is from added water (48) and 62% is from added water (49) at maximum power output. Further increasing the mass input of water (48) for the system shown will allow 22% excess solar energy (42) before working fluid (28) reaches 100% humidity. Input of solar energy (42) is highly variable and seldom available at a design maximum. This hybrid Brayton feature allows designing solar collector (6) at 80% maximum energy input with a continuous operation over a 60% reduction in solar input while still handling 22% of excess solar input.

Figure 7:
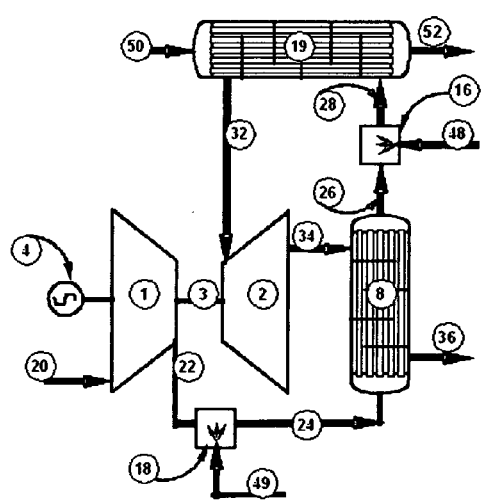
FIG. 7 is a schematic diagram of an externally heated microturbine that applies evaporative cooling of the working fluid both before the recuperator and after the recuperator.

The hybrid Brayton modifications shown in FIG. 7 includes adding water (49) into chamber (18) immediately before recuperator (8) to cause evaporative cooling of working fluid (22) and adding water (48) into chamber (16) immediately after recuperator (8) to cause evaporative cooling of working fluid (26). Adding water (48) increases the energy taken into the system through heater (19) while adding water (49) increases the energy kept with the system through recuperator (8). Reducing the flow of working fluid (20) will increase the overall system efficiency at every power level of operation by reducing the parasitic power requirement of compressor (1). Sufficient flow of working fluid (20) must be maintained to absorb the addition of water (48) and water (49) without exceeding the general limitation of saturation of working fluid (24) or working fluid (28). FIG. 17 and FIG. 18 reveal the effects of turndown when the flow of working fluid (20) is reduced, the addition of water (49) is kept constant relative to working fluid (20) and the addition of water (48) is adjusted in response to input energy reduction by reduced flow of external hot fluid (50). The increased overall efficiency at all levels of operation produces greater net power output and an increased effective range of turndown.

Figure 8:
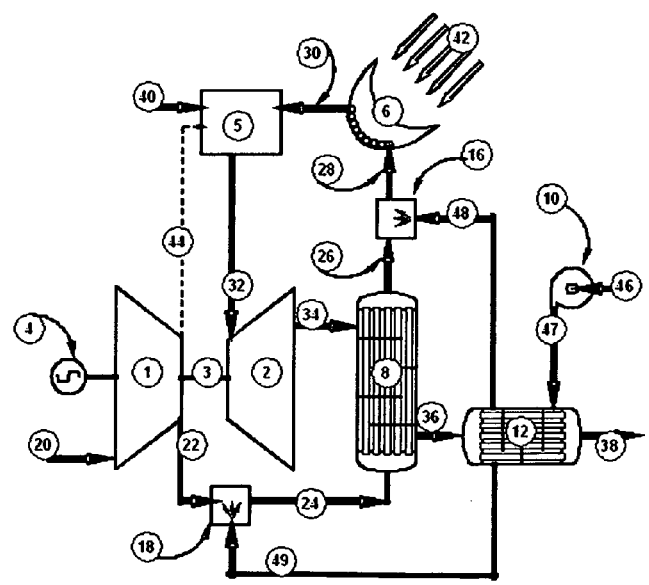
FIG. 8 is a schematic diagram of a solar microturbine that applies evaporative cooling of the working fluid and uses turbine exhaust energy to pre-heat the evaporative fluid.

FIG. 8 shows an enhancement of the hybrid Brayton system of FIG. 6 wherein energy in turbine exhaust (36) exiting recuperator (8) is recovered in preheater (12). Supply water (46) to be used as evaporative fluid is pressurized in pump (10) to high-pressure water (47) feeding preheater (12). Thermal energy in turbine exhaust (36) is indirectly transferred into pressure water (47) to preheat added water (48) and added water (49). System efficiency is increased by the recovery of energy from turbine exhaust (36) and kept within the power cycle.

Turbine exhaust (38) exiting preheater (12) is sufficiently hot that it may be used for purposes external to the hybrid Brayton system. Using turbine exhaust (38) for space heating, process heat or the like will serve to capture more useful energy from the energy supplied to high pressure working fluid (32). Such an arrangement serves a larger scope of energy supply as a Combined Heat and Power system.

Figure 9:
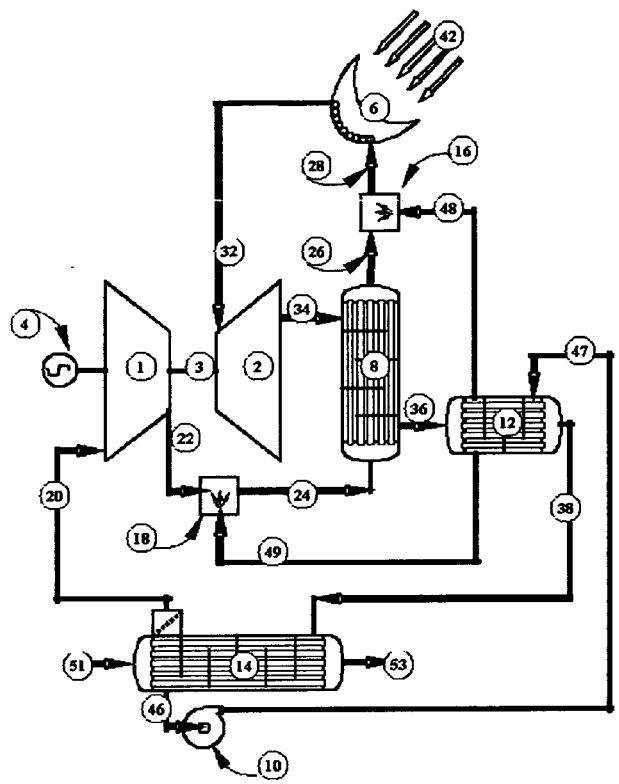
FIG. 9 is a schematic diagram of a solar microturbine that applies evaporative cooling of the working fluid and captures the working fluid into a closed cycle.

It is further recognized that the hybrid Brayton system can be operated in a closed loop arrangement. FIG. 9 shows a closed loop application of the hybrid Brayton cycle shown in FIG. 8. In this arrangement the working fluid can also be a gas, other than air, that maintains its vapor state throughout the power cycle. Further, the evaporative fluid can be a liquid, other than water, that will evaporate and condense under the application conditions of the power cycle. Working fluid (20) is compressed by compressor (1) and increases in pressure and temperature to produce working fluid (22). Evaporative fluid (49) is added to working fluid (22) and evaporates to produce working fluid (24) at a lesser temperature than working fluid (22) but with a mass flow that is the sum of mass flow of working fluid (22) and mass flow of evaporative fluid (49). Working fluid (24) enters the first side of recuperator (8) and is indirectly heated to produce working fluid (26). Evaporative fluid (48) is added to working fluid (26) and evaporates to produce working fluid (28) at a lesser temperature than working fluid (26) but with a mass flow that is the sum of mass flow of working fluid (26) and mass flow of evaporative fluid (48). Working fluid (28) enters solar collector (6) and is heated by solar energy (42) to produce working fluid (32) that is at a higher temperature than working fluid (28). Working fluid (32) enters turbine (2) where it expands and releases work to shaft (3). Turbine exhaust (34) exits turbine (2) at a lower pressure and enthalpy than working fluid (32) and is fed into the second side of recuperator (8). Thermal energy from turbine exhaust (34) transfers into working fluid (24) and reduces the temperature of turbine exhaust (36) as compared to turbine exhaust (34). Turbine exhaust (36) enters the first side of preheater (12) and reduces temperature further to exit as turbine exhaust (38). Turbine exhaust (38) is fed into the second side of cooler (14) in which evaporative fluid (46) condenses and is extracted to feed pump (10).

An external coolant (51) enters cooler (14) and exits as coolant (53). Working fluid (20) leaves cooler (14) at a lower temperature and generally 100% saturated with evaporative fluid in vapor condition. Coolant (51) enters the first side of cooler (14) and exits at the higher temperature of coolant (53) due to absorbing energy from turbine exhaust (38). Evaporative fluid (47) leaves pump (10) at higher pressure and is fed into second side of preheater (12) where it increases in temperature and exits as evaporative fluid (48) and evaporative fluid (49). Work that was released to shaft (3) is supplied as parasitic power to compressor (1) plus net output power (4).

Figure 10:
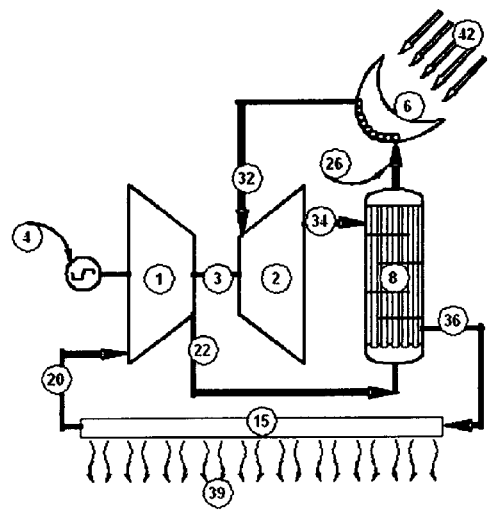
FIG. 10 is a schematic diagram of a closed cycle solar microturbine that applies evaporative cooling of the working fluid and maintains entrainment of evaporative fluid in the working fluid when in its liquid form, and which employs radiative cooling.

FIG. 10 shows a closed loop hybrid Brayton system which operates under conditions where liquid evaporative fluid can be kept in suspension with working fluid vapor to allow flow through the power cycle as an effectively homogenous fluid. Suitable conditions for such suspension may exist between particular fluids and in the microgravity environment of outer space. In this arrangement the working fluid can be a gas, other than air, that maintains its vapor state throughout the power cycle. Further, the evaporative fluid can be a liquid, other than water, that will evaporate and condense under the application conditions of the power cycle. Working fluid (20) contains a mixture of working fluid gas saturated with evaporative fluid vapor with liquid evaporative fluid mixed throughout the working fluid allowing substantially contiguous flow. Working fluid (20) is compressed by compressor (1) which increases in pressure and temperature to produce working fluid (22) at a higher pressure and enthalpy also containing liquid evaporative fluid mixed throughout and allowing contiguous flow. Some of the enthalpy increase of working fluid (20) is absorbed by evaporation of a portion of the evaporative fluid liquid within working fluid (20) during compression by compressor (1) resulting in working fluid (22) being at a temperature lower than it would be otherwise. Working fluid (22) contains a mixture of working fluid gas saturated with evaporative fluid vapor with liquid evaporative fluid mixed throughout the working fluid allowing substantially contiguous flow. Working fluid (22) enters the first side of recuperator (8) and absorbs energy to increase the enthalpy of working fluid (22) which increases the temperature of the gas and vapor while vaporizing a portion of evaporative fluid liquid within working fluid (22). Working fluid (26) exits the first side of recuperator (8) in a saturated condition and at a temperature that is lower than it would be if there was no evaporative fluid vaporization within recuperator (8). Working fluid (26) contains working fluid gas that is saturated with evaporative fluid vapor and may still include liquid evaporative fluid mixed throughout and allowing contiguous flow. Working fluid (26) is fed to solar collector (6) wherein solar energy (42) is added. Working fluid (32) leaves solar collector (6) at a temperature higher than working fluid (26) and, ideally, as a mixture of working fluid gas and evaporative fluid vapor with all of the liquid evaporative fluid having been vaporized. Working fluid (32) enters turbine (2) where it expands and releases work to shaft (3). Turbine exhaust (34) exits turbine (2) at a lower pressure and enthalpy than working fluid (32) and is fed into the second side of recuperator (8). Thermal energy from turbine exhaust (34) transfers into working fluid (22) and reduces the temperature of turbine exhaust (36) as compared to turbine exhaust (34). Turbine exhaust (36) is fed into cooler (15) which cools turbine exhaust (36) and condenses evaporative fluid to form working fluid (20) which contains a mixture of working fluid gas saturated with evaporative fluid vapor with liquid evaporative fluid mixed throughout the working fluid allowing substantially contiguous flow. Cooler (15) may be a radiant cooler in a microgravity application in outer space which radiates energy (39) removed from turbine exhaust (36). Work that was released to shaft (3) is supplied as parasitic power to compressor (1) plus net output power (4). Compressor (1) is of a design that is tolerant of included liquid within working fluid (20). Turbine (2) may preferably be of a design that is tolerant of included liquid within working fluid (32) should such a condition occur.

The hybrid Brayton cycle opens new application potential for microturbines such as those described in paragraph 2 of the Background of the Invention section above. For microturbines as shown in FIG. 1 the efficiency reduction at lower power levels makes operating the system much more expensive for load-following applications. When operated under continuous maximum power output, it is found that the peak 26% efficiency may or may not be economically justified. When not connected to a power grid or other power load that can ensure full power operation, it is found that microturbines will have a turndown of only 30% based on maintaining an overall efficiency exceeding 20%. The reduced efficiency will often mean that a microturbine is uneconomical for load-following applications. Applying the hybrid Brayton modification as shown in FIG. 6 but without solar collector (6), offers operational flexibility to match the consumption pattern of the user. When operated under continuous maximum power output, the hybrid Brayton microturbine will produce a peak efficiency of 36% which makes it much easier to economically justify. When not connected to a power grid or other power load that can ensure full power operation, the hybrid Brayton microturbine can extend the turndown range to over 75% based on maintaining an overall efficiency over 20%. A balance between the maximum efficiency increase of full power operation and the increased turndown capability can be designed into the hybrid Brayton system which allows optimizing the equipment to the consumption pattern of the user.

The hybrid Brayton cycle opens new application potential for solar microturbines. For solar microturbines as shown in FIG. 2 the efficiency reduction at lower energy input levels makes the system impractical for a stand-alone solar energy system. Solar collectors are difficult to design at a precise maximum energy input level. Excess energy input into the solar microturbine shown in FIG. 2 would result in higher temperature of working fluid (30) carrying it beyond the limit temperature for entering turbine (2). Insufficient energy input into the solar microturbine shown in FIG. 2 would result in a large drop in power production. A 25% drop in solar energy input would result in a 75% drop in power output and a 35% drop in solar energy input would result in the solar microturbine ceasing to function. A practical approach to this situation is to inject fuel (40) into combustor (5) to maintain power output. Since a practical solar system will typically operate at a solar input level well below its maximum then this approach means the system becomes a solar-assisted microturbine rather than a solar microturbine.

Applying the hybrid Brayton modification as shown in FIG. 6 but without combustor (5), offers operational flexibility to create a stand-alone solar microturbine. It is recognized that solar energy input can vary significantly from morning to night, over changing seasons, in various atmospheric conditions and through cloud interference. The hybrid Brayton modification will allow relatively efficient power production over a range of 75% reduction in solar energy input and continued operation up to a 90% loss of input solar energy. Further the hybrid Brayton solar microturbine system can be designed for full power output at a design point that is less than full solar energy input, capable of tolerating an excessive solar energy input while maintaining full power output and continue producing reasonable power output if the solar energy input reduces. For instance a hybrid Brayton solar system could be designed to operate at 80% of the expected maximum solar energy input. This system would continue to supply full power output, without damage, if the solar energy input exceeded the design level by up to 20%. This system would also provide power output above a 20% overall efficiency if the solar energy input reduced by 60% and continue to operate until the solar energy input reduced by 70%. This makes the hybrid Brayton solar microturbine system practical for stand-alone operation.

Figure 3:
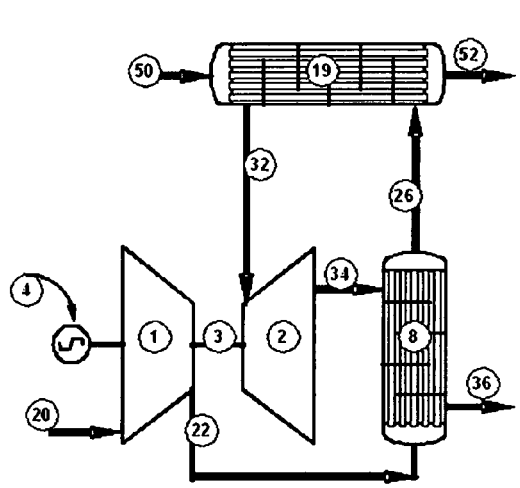

The hybrid Brayton cycle opens new application potential for externally heated microturbines. For external microturbines as shown in FIG. 3 low overall efficiency and low maximum net power output makes the system difficult to justify economically. The hybrid Brayton modification as shown in FIG. 7 recovers more of the energy available in external hot fluid (50) and recaptures more of the energy available in turbine exhaust (34) resulting in more than twice the net power output from almost half the energy input; almost four times the net overall efficiency. Moreover the efficiency remains sufficiently high through turndown to allow the hybrid Brayton external microturbine to be used in a load following application.

In summary, one or more embodiments of the invention teach a hybrid Brayton modification that:
- overcomes the limitations of small turndown range associated with the microturbine shown in FIG. 1 and the solar microturbine shown in FIG. 2.
- overcomes the limitations of maximum power production associated with the externally heated microturbine shown in FIG. 3.
- increases the efficiency of the power cycle.
- for a system with a temperature independent energy input, enables a balance to be made to maximize efficiency increases while limiting the increased range of turndown or limiting the efficiency increase while increasing the turndown range.
- handles excess solar energy input to the system.

In any application of these hybrid Brayton modifications, the benefits are realized by optimizing equipment.

The invention is not limited to the embodiments described herein which may be modified or varied without departing from the scope of the invention.

The invention claimed is:

1. A method of converting solar energy into electricity using atmospheric air as a gaseous working fluid in a Brayton cycle, comprising steps of:
   directing atmospheric air, to be used as working fluid, to the inlet of a compressor;
   pressuring said gaseous working fluid in said compressor;
   heating said high-pressure working fluid in a recuperator using thermal energy in the low-pressure working fluid emerging from a turbine;
   further heating said high-pressure working fluid in a solar receiver to further increase the temperature and enthalpy of said working fluid;
   expanding said working fluid by expansion through said turbine, and using the work of said turbine to generate electricity;

cooling said low-pressure working fluid emerging from said turbine in said recuperator, which is arranged in counter-flow to said high-pressure working fluid from said compressor;

releasing said gaseous working fluid to the atmosphere;

wherein the inlet temperature of said turbine is controlled in response to the level of solar energy input, by lowering the temperature and increasing the mass of said high-pressure working fluid entering said solar receiver by introducing an evaporative fluid before said solar receiver to produce evaporative cooling; and adjusting the flow of said evaporative fluid to maximize the power production of said turbine consistent with the level of solar energy received and the maximum allowable turbine inlet temperature.

2. The method of claim 1 in which said evaporative fluid is water.

3. The method as in claim 1 wherein the thermal conversion efficiency of said method is increased by lowering the temperature and increasing the mass of said high-pressure working fluid prior entering said recuperator by introducing said evaporative fluid before the recuperator to produce evaporative cooling.

4. The method as in claim 1 wherein the flow of evaporative fluid is adjusted to reduce the thermal conversion efficiency consistent with producing a desired level of power that is less than the maximum possible level that can be produced for the level of solar energy received.

5. The method as in claim 4 wherein the thermal conversion efficiency is increased by introducing said evaporative fluid into said high-pressure working fluid before said recuperator.

6. The method of claim 1 wherein said evaporative fluid is pre-heated using thermal energy in said low-pressure working fluid emerging from said recuperator.

7. The method of claim 1 wherein said low pressure working fluid emerging from said recuperator, after pre-heating said evaporative fluid, is utilized for external heating, thus providing a combined heat and power system from said solar energy.

8. A method of converting energy in a hot flue gas into electricity using atmospheric air as a gaseous working fluid in a Brayton cycle, comprising steps of:

directing atmospheric air, to be used as working fluid, to the inlet of a compressor;

pressuring said gaseous working fluid in said compressor;

heating said high-pressure working fluid in a recuperator using thermal energy in low-pressure working fluid emerging from a turbine;

further heating said high-pressure working fluid in a flue gas heater, which is arranged in counter-flow to said hot flue gas, to further increase the temperature and enthalpy of said working fluid;

expanding said working fluid by expansion through said turbine, and using the work of said turbine to generate electricity;

cooling said low-pressure working fluid emerging from said turbine in said recuperator, which is arranged in counter-flow to said high-pressure working fluid from said compressor;

releasing said gaseous working fluid to the atmosphere;

lowering the temperature and increasing the mass of said high-pressure working fluid by introducing an evaporative fluid before said flue gas heater to produce evaporative cooling; and adjusting the flow of said evaporative fluid to maximize the power production of said turbine consistent with the level of flue gas energy available and the maximum allowable turbine inlet temperature.

9. The method of claim 8 in which said evaporative fluid is water.

10. The method of claim 8 wherein the method is further enhanced for added thermal conversion efficiency by lowering the temperature and increasing the mass of said high-pressure working fluid before the recuperator by introducing said evaporative fluid to produce evaporative cooling.

11. The method of claim 8 wherein the flow of evaporative fluid is adjusted to reduce the thermal conversion efficiency consistent with producing a desired level of power that is less than the maximum possible level that can be produced for the level of flue gas energy available.

12. The method of claim 8 wherein the thermal conversion efficiency is increased by introducing said evaporative fluid into said high-pressure working fluid before said recuperator.

13. The method of claim 8 wherein said evaporative fluid is pre-heated using thermal energy in low-pressure working fluid emerging from said recuperator.

14. The method of claim 8 wherein said low pressure working fluid emerging from said recuperator, after pre-heating said evaporative fluid, is utilized for external heating, thus providing a combined heat and power system from said hot flue gas.

15. A method of converting solar energy into electricity using a gaseous working fluid in a closed-loop Brayton cycle, comprising steps of:

directing gaseous working fluid to the inlet of a compressor;

pressuring said gaseous working fluid in said compressor;

heating said high-pressure working fluid in a recuperator using thermal energy in the low-pressure working fluid emerging from a turbine;

further heating said high-pressure working fluid in a solar receiver to further increase the temperature and enthalpy of said working fluid;

expanding said working fluid by expansion through said turbine, and using the work of said turbine to generate electricity;

cooling said low-pressure working fluid emerging from said turbine in said recuperator, which is arranged in counter-flow to said high-pressure working fluid from said compressor;

diverting said low-pressure gaseous working fluid emerging from said recuperator to a cooler;

cooling said low-pressure working fluid in said cooler, which is arranged in counter-flow to an external coolant, and in which said cooler acts to at least partially condense said evaporated evaporative fluid;

separating said condensed evaporative cooling fluid from said gaseous working fluid and directing it for use as an evaporative fluid in said cycle; and directing said gaseous fluid emerging from said cooler/condenser to the inlet of said compressor;

wherein the inlet temperature of said turbine is controlled in response to the level of solar energy input, by lowering the temperature and increasing the mass of said high-pressure working fluid entering said solar receiver by introducing an evaporative fluid before said solar receiver to produce evaporative cooling; and adjusting the flow of said evaporative fluid to maximize the power production of said turbine consistent with the level of solar energy received and the maximum allowable turbine inlet temperature.

16. The method of claim 15 in which said evaporative fluid is water.

17. The method of claim 15 wherein said gaseous fluid is a fluid other than air.

18. The method of claim 15 wherein said evaporative fluid is a fluid other than water.

19. The method as in claim 15 wherein the thermal conversion efficiency of said method is increased by lowering the temperature and increasing the mass of said high-pressure working fluid prior entering said recuperator by introducing said evaporative fluid before the recuperator to produce evaporative cooling.

20. The method as in claim 15 wherein the flow of evaporative fluid is adjusted to reduce the thermal conversion efficiency consistent with producing a desired level of power that is less than the maximum possible level that can be produced for the level of solar energy received.

21. The method of claim 15 wherein said external coolant emerging from said cooler is utilized for external heating made thus providing a combined heat and power system.

22. A method of converting energy in a hot flue gas into electricity using a gaseous working fluid in a closed-loop Brayton cycle, comprising steps of:
   directing gaseous working fluid to the inlet of a compressor;
   pressuring said gaseous working fluid in said compressor;
   heating said high-pressure working fluid in a recuperator using thermal energy in low-pressure working fluid emerging from a turbine;
   further heating said high-pressure working fluid in a flue gas heater, which is arranged in counter-flow to said hot flue gas, to further increase the temperature and enthalpy of said working fluid;
   expanding said working fluid by expansion through said turbine, and using the work of said turbine to generate electricity;
   cooling said low-pressure working fluid emerging from said turbine in said recuperator, which is arranged in counter-flow to said high-pressure working fluid from said compressor;
   diverting said low-pressure gaseous working fluid emerging from said recuperator to a cooler;
   cooling said low-pressure working fluid in said cooler, which is arranged in counter-flow to an external coolant, and in which said cooler acts to at least partially condense said evaporated evaporative fluid;
   separating said condensed evaporative cooling fluid from said gaseous working fluid and directing it for use as an evaporative fluid in said cycle;
   directing said gaseous fluid emerging from said cooler to the inlet of said compressor;
   lowering the temperature and increasing the mass of said high-pressure working fluid by introducing an evaporative fluid before said flue gas heater to produce evaporative cooling; and
   adjusting the flow of said evaporative fluid to maximize the power production of said turbine consistent with the level of flue gas energy available and the maximum allowable turbine inlet temperature.

23. The method of claim 22 in which said evaporative fluid is water.

24. The method of claim 22 wherein said gaseous fluid is a fluid other than air.

25. The method of claim 22 wherein said evaporative fluid is a fluid other than water.

26. The method as in claim 22 wherein the thermal conversion efficiency of said method is increased by lowering the temperature and increasing the mass of said high-pressure working fluid prior entering said recuperator by introducing said evaporative fluid before the recuperator to produce evaporative cooling.

27. The method as in claim 22 wherein the flow of evaporative fluid is adjusted to reduce the thermal conversion efficiency consistent with producing a desired level of power that is less than the maximum possible level that can be produced for the level of solar energy received.

28. The method of claim 22 wherein said external coolant emerging from said cooler is utilized for external heating made thus providing a combined heat and power system.

* * * * *